US012732770B2

(12) United States Patent
Eubank et al.

(10) Patent No.: US 12,732,770 B2
(45) Date of Patent: Sep. 8, 2026

(54) ENHANCED AUDIO USING PERSONAL AUDIO DEVICE

(71) Applicant: Apple Inc., Cupertino, CA (US)

(72) Inventors: Christopher T. Eubank, Santa Barbara, CA (US); Ronald J. Guglielmone, Jr., Redwood City, CA (US)

(73) Assignee: Apple Inc., Cupertino, CA (US)

( * ) Notice: Subject to any disclaimer, the term of this patent is extended or adjusted under 35 U.S.C. 154(b) by 157 days.

(21) Appl. No.: 18/563,269

(22) PCT Filed: Jun. 3, 2022

(86) PCT No.: PCT/US2022/032080

§ 371 (c)(1),
(2) Date: Nov. 21, 2023

(87) PCT Pub. No.: WO2022/260938

PCT Pub. Date: Dec. 15, 2022

(65) Prior Publication Data

US 2024/0381052 A1 Nov. 14, 2024

Related U.S. Application Data

(60) Provisional application No. 63/197,709, filed on Jun. 7, 2021.

(51) Int. Cl.
*H04S 7/00* (2006.01)

(52) U.S. Cl.
CPC .................................... *H04S 7/304* (2013.01)

(58) Field of Classification Search
CPC ........... H04S 3/008; H04S 7/30; H04R 3/001; H04R 5/021; H04R 2420/07
See application file for complete search history.

(56) References Cited

U.S. PATENT DOCUMENTS

| | | | | |
|---|---|---|---|---|
| 7,752,050 | B1 * | 7/2010 | Hameed | A61B 1/00042 704/275 |
| 10,715,933 | B1 * | 7/2020 | Ma | H04R 25/405 |
| 10,721,580 | B1 * | 7/2020 | Hoffmann | H04S 7/301 |
| 10,728,676 | B1 * | 7/2020 | El Guindi | H04R 1/1041 |

(Continued)

FOREIGN PATENT DOCUMENTS

| | | | | |
|---|---|---|---|---|
| EP | 3657822 A1 | | 5/2020 | |
| EP | 3232690 B1 | * | 9/2020 | H04S 7/301 |

OTHER PUBLICATIONS

PCT/US2022/032080, "PCT Notification of Transmittal of the International Search Report and the Written Opinion of the International Searching Authority, or the Declaration", mailed Sep. 27, 2022, 10 pages.

(Continued)

*Primary Examiner* — Yosef K Laekemariam
(74) *Attorney, Agent, or Firm* — Aikin & Gallant, LLP

(57) ABSTRACT

A head-worn device can determine that a playback device is outputting audio content. A microphone of the head-worn device can sense the audio content that is output by the playback device. Spatial filters can be applied to one or more audio channels of additional audio content that complements the audio content output by the playback device. The resulting spatialized audio can be played through speakers to a user wearing the head-worn device.

20 Claims, 6 Drawing Sheets

METHOD 50

(56) References Cited

U.S. PATENT DOCUMENTS

| | | | | |
|---|---|---|---|---|
| 10,856,095 | B2 | 12/2020 | Roach et al. | |
| 2003/0099369 | A1 | 5/2003 | Cheng | |
| 2008/0118078 | A1 | 5/2008 | Asada et al. | |
| 2008/0205659 | A1 * | 8/2008 | Fischer | H04R 25/552 381/23.1 |
| 2018/0124526 | A1 * | 5/2018 | Solum | H04R 25/505 |
| 2018/0310042 | A1 | 10/2018 | Mayalil et al. | |
| 2021/0084357 | A1 * | 3/2021 | Tajik | H04N 7/157 |
| 2021/0099826 | A1 * | 4/2021 | Hassager | H04R 5/033 |
| 2021/0127223 | A1 * | 4/2021 | Mohapatra | G06F 3/0482 |
| 2021/0219089 | A1 * | 7/2021 | Sim | H04S 7/306 |
| 2022/0322023 | A1 * | 10/2022 | Robinson | H04R 5/02 |

OTHER PUBLICATIONS

Willcox et al., “Better TV Sound for Those With Hearing Loss”, received from https://www.consumerreports.org/LCD-led-oled-tvs/better-tv-sound-for-those-with-hearing-loss/, dated Mar. 12, 2018, 7 pages.

Banks et al., “Top 5 Devices for Watching TV with Hearing Loss”, received from https://www.clearliving.com/hearing/technology/watching-tv-and-movies/, dated Oct. 15, 2020, 13 pages.

Apple Support, “Use Bluetooth accessories with your Apple TV”, received from https://support.apple.com/en-us/HT205302, Published Date: Sep. 24, 2019, 4 pages.

Sony Support, “What Is SAP and how Do I Turn It On or Off?”, received from https://www.sony.com/electronics/support/articles/00024315, Oct. 24, 2017, 4 pages.

Sony, “WH-L600 Digital Surround Wireless Headphones”, received from https://www.sony.com/electronics/headband-headphones/wh-1600, 2020, 9 pages.

* cited by examiner

ENHANCED AUDIO USING PERSONAL AUDIO DEVICE

This application claims the benefit of the U.S. Provisional Application No. 63/197,709, filed Jun. 7, 2021 which is incorporated by reference in its entirety.

FIELD

One aspect of the disclosure relates to enhancing an audio experience of a user by presenting an additional layer of audio that relates to audio content that is being consumed by the user.

BACKGROUND

Audio content can be played to a user in a listening environment. For example, a user can watch a movie or other audiovisual work on a television set or other playback device. In some cases, a media streaming device can provide content to a television.

Humans can estimate the location of a sound by analyzing the sounds at their two ears. This is known as binaural hearing and the human auditory system can estimate directions of sound using the way sound diffracts around and reflects off of our bodies and interacts with our pinna. These spatial cues can be artificially generated using spatial filters.

Audio can be rendered for playback with spatial filters so that the audio is perceived to have spatial qualities, for example, originating from a location above, below, or to a side of a listener. The spatial filters, when applied to audio content, can artificially impart spatial cues into the audio that resemble the diffractions, delays, and reflections that are naturally caused by our body geometry and pinna.

SUMMARY

When a user watches audiovisual content through a playback device (e.g., a television, computer, tablet computer, mobile phone, projector, etc.), additional audio and/or visual content can be overlaid on the content that is played through the playback device, to enhance the user's experience. The additional audio content can be synchronized with the playback content. The additional audio content can also be spatialized and volume-corrected based on the playback content. The additional audio content can thus be presented to a user so that it blends in with the content output by the playback device.

A head-worn device such as a headphone set, smart glasses, a head up display (HUD), virtual reality (VR) displays, or other head-worn audio processing device, can include speakers that are fixed to a location over or on the side of a user's ears. Some head-worn devices, such as wearable devices having extra-aural speakers, open-back headphones, or headphones with transparency, still allow for other sounds in the user's environment to travel to the user's ears and be heard. Such a head-worn device can play additional audio content, such as dialogue, factoids, music, or other audio content, to augment the user's experience of the content. The head-worn device can output this enhanced audio based on one or more conditions being satisfied.

For example, a system can, in an automated manner, identify that the user is watching content on a video playback device, identify what content the user is watching, and/or identify that additional audio content is available for the content. The system can present an affordance (e.g., a visual or audio prompt) that allows the user to opt-in to an audio augmentation, or automatically present the audio augmentation to the user. The audio augmentation can be spatially rendered to the user through speakers of the head-worn device, to make the enhanced audio blend in with or enhance the user's audio experience.

In some aspects, a method can be performed by a computing device (e.g., a head-worn device). A microphone signal can be obtained that is produced by a microphone of the head-worn device that is worn by a user. A playback device can be determined to be outputting audio content. The audio can relate to a visual work such as a movie, a music video, a sitcom, a graphical user interface, or a purely audio work such as a song, a podcast, a story, or other audio content. The microphone signal can be processed to determine if the audio content that is played by the playback device is present in the microphone signal. If so, this can indicate that the user is in the same room or within some threshold distance relative to the playback device such that the user is likely to be watching and/or listening to the playback device. Additional audio content can be obtained that relates to the content that is being played by the playback device. One or more filters can be applied to one or more audio channels that represent the additional audio content, resulting in spatialized audio that is used to drive speakers of the head-worn device.

In such a manner, a playback device can provide additional audio that is combined with the content that is played through the playback device. The additional audio can be spatialized in a manner that blends in with the existing playback audio (e.g., by virtually locating the enhanced audio at the location of the playback device), or provides an improved audio experience (e.g., by providing surround sound).

The above summary does not include an exhaustive list of all aspects of the present disclosure. It is contemplated that the disclosure includes all systems and methods that can be practiced from all suitable combinations of the various aspects summarized above, as well as those disclosed in the Detailed Description below and particularly pointed out in the Claims section. Such combinations may have particular advantages not specifically recited in the above summary.

BRIEF DESCRIPTION OF THE DRAWINGS

Several aspects of the disclosure here are illustrated by way of example and not by way of limitation in the figures of the accompanying drawings in which like references indicate similar elements. It should be noted that references to "an" or "one" aspect in this disclosure are not necessarily to the same aspect, and they mean at least one. Also, in the interest of conciseness and reducing the total number of figures, a given figure may be used to illustrate the features of more than one aspect of the disclosure, and not all elements in the figure may be required for a given aspect.

DETAILED DESCRIPTION

Figure 1:
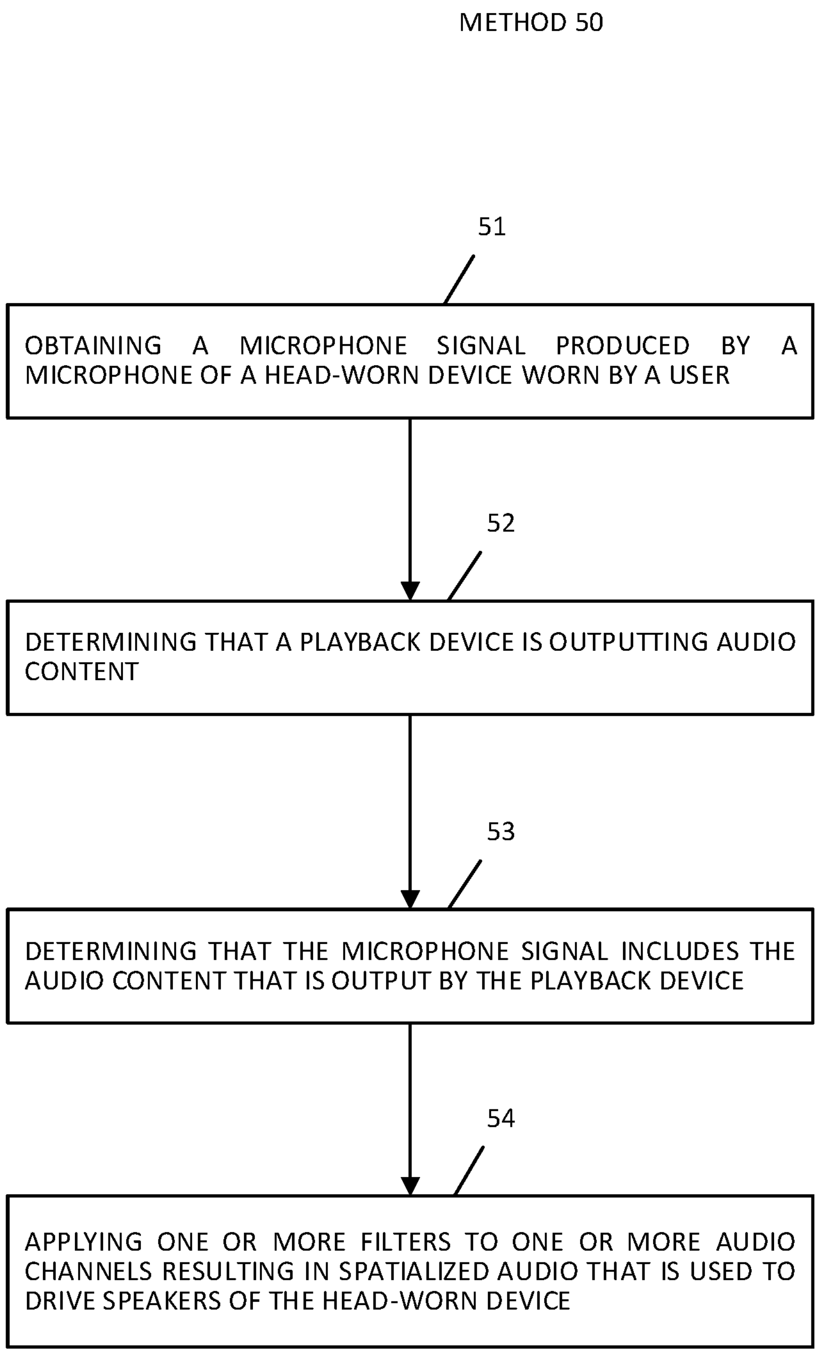
FIG. 1 shows a method for presenting additional audio through speakers of a head-worn device, according to some aspects.

Several aspects of the disclosure with reference to the appended drawings are now explained. Whenever the shapes, relative positions and other aspects of the parts described are not explicitly defined, the scope of the invention is not limited only to the parts shown, which are meant merely for the purpose of illustration. Also, while numerous details are set forth, it is understood that some aspects of the disclosure may be practiced without these details. In other instances, well-known circuits, algorithms, structures, and techniques have not been shown in detail so as not to obscure the understanding of this description.

People may sense or interact with a physical environment or world without using an electronic device. Physical features, such as a physical object or surface, may be included within a physical environment. For instance, a physical environment may correspond to a physical city having physical buildings, roads, and vehicles. People may directly sense or interact with a physical environment through various means, such as smell, sight, taste, hearing, and touch. This can be in contrast to an extended reality (XR) environment that may refer to a partially or wholly simulated environment that people may sense or interact with using an electronic device. The XR environment may include virtual reality (VR) content, mixed reality (MR) content, augmented reality (AR) content, or the like. Using an XR system, a portion of a person's physical motions, or representations thereof, may be tracked and, in response, properties of virtual objects in the XR environment may be changed in a way that complies with at least one law of nature. For example, the XR system may detect a user's head movement and adjust auditory and graphical content presented to the user in a way that simulates how sounds and views would change in a physical environment. In other examples, the XR system may detect movement of an electronic device (e.g., a laptop, tablet, mobile phone, or the like) presenting the XR environment. Accordingly, the XR system may adjust auditory and graphical content presented to the user in a way that simulates how sounds and views would change in a physical environment. In some instances, other inputs, such as a representation of physical motion (e.g., a voice command), may cause the XR system to adjust properties of graphical content.

Numerous types of electronic systems may allow a user to sense or interact with an XR environment. A non-exhaustive list of examples includes lenses having integrated display capability to be placed on a user's eyes (e.g., contact lenses), heads-up displays (HUDs), projection-based systems, head mountable systems, windows or windshields having integrated display technology, headphones/earphones, input systems with or without haptic feedback (e.g., handheld or wearable controllers), smartphones, tablets, desktop/laptop computers, and speaker arrays. Head mountable systems may include an opaque display and one or more speakers. Other head mountable systems may be configured to receive an opaque external display, such as that of a smartphone. Head mountable systems may capture images/video of the physical environment using one or more image sensors or capture audio of the physical environment using one or more microphones. Instead of an opaque display, some head mountable systems may include a transparent or translucent display. Transparent or translucent displays may direct light representative of images to a user's eyes through a medium, such as a hologram medium, optical waveguide, an optical combiner, optical reflector, other similar technologies, or combinations thereof. Various display technologies, such as liquid crystal on silicon, LEDs, uLEDs, OLEDs, laser scanning light source, digital light projection, or combinations thereof, may be used. In some examples, the transparent or translucent display may be selectively controlled to become opaque. Projection-based systems may utilize retinal projection technology that projects images onto a user's retina or may project virtual content into the physical environment, such as onto a physical surface or as a hologram.

FIG. 1 shows a method for presenting additional audio through speakers (e.g., extra-aural speakers) of a head-worn device, according to some aspects. The method 50 can be performed with various aspects described. The method may be performed by hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof, which can be referred to as processing logic. Although specific function blocks ("blocks") are described in the method, such blocks are examples. That is, aspects are well suited to performing various other blocks or variations of the blocks recited in the method. It is appreciated that the blocks in the method may be performed in an order different than presented, and that not all of the blocks in the method may be performed.

At block 51, the method includes obtaining a microphone signal produced by a microphone of a head-worn device worn by a user. In some aspects, the head-worn device can include multiple microphones that produce multiple microphone signals.

At block 52, the method includes determining that a playback device is outputting audio content. For example, the playback device, or a separate media device can be queried as what content, if any, is being output by the playback device. Computer vision can be used to detect a playback device (e.g., recognizing a television or other playback device in images) and/or detect content (e.g., a movie) that is playing on a display of the playback device. Microphone signals can be processed to detect sounds in order to determine that the playback device is outputting audio content.

At block 53, the method includes determining that the microphone signal includes the audio content that is output by the playback device. The microphone signals can be summed or averaged to obtain the microphone signal, or a microphone signal can be selected from a plurality of microphone signals. In some aspects, each of the microphone signals of a plurality of microphones are obtained and each are processed individually to determine whether any of them include the audio content that is output by the playback device. In such a manner, the method can determine whether the user can hear the content, which can serve as an indication that the user is watching or listening to the content played by the playback device. This can also indicate if the user is located in the same room or listening environment as the playback device.

At block 54, the method includes applying one or more filters to one or more audio channels resulting in spatialized audio that is used to drive speakers of the head-worn device. The one or more audio channels can be representative of additional audio content that is played as an additional layer of audio, in a manner that is synchronized with the audio and/or visual output of the playback device. Synchronized can refer to temporal alignment.

Humans can estimate the location of a sound by analyzing the sounds at their two ears. This is known as binaural hearing and the human auditory system can estimate directions of sound using the way sound diffracts around and reflects off of our bodies and interacts with our pinna. These spatial cues can be artificially generated by applying spatial filters such as head related impulse responses (HRIRs) or head related transfer functions (HRTFs) to audio signals.

The filters can artificially impart spatial cues into the audio that resemble the diffractions, delays, and reflections that are naturally caused by our body geometry and pinna. The spatially filtered audio can be produced by a spatial audio reproduction system and output through headphones. In such a manner, audio can be rendered for playback so that the audio is perceived to have spatial qualities, for example, originating from a location above, below, or to a side of a listener.

In some aspects, the one or more filters are applied to the one or more audio channels such that the spatialized audio has a virtual location that is perceived by a wearer of the head-worn device to originate from a location of the playback device. In such a manner, the additional audio blends in with the experience of the user. For example, if the user is watching a movie on the playback device (e.g., a television), then the additional content can be spatialized and played back through the speakers so that the user perceives the additional content as originating from the television.

In some aspects, the one or more filters are applied to the one or more audio channels such that the spatialized audio has a plurality of virtual locations that is perceived by a wearer of the head-worn device to have a plurality of fixed virtual positions surrounding the wearer of the head-worn device. For example, the additional audio content can be spatialized to have virtual locations that correspond to surround sound speaker locations such as a 5.1 speaker layout (with a center, front left, front right, rear left, and rear right speaker) or a 7.1 speaker layout (with a center, sub, front left, front right, back left, back right, side left, and side right).

The spatial filters can be adjusted based on a tracked head position of the user. One or more sensors of the head-worn device, for example, a camera, an accelerometer, a gyroscope, an inertial measurement unit (IMU), or combinations thereof, can provide head position in terms of spherical coordinates (e.g., roll, pitch, and yaw), and/or coordinates in three-dimensional space (e.g., on an X, Y, and Z plane). The tracked head position can be determined with three or six degrees of freedom. The spatial filters can be determined and updated based on the tracked head position, in a manner that compensates for the tracked head position of the user.

For example, based on the location of the user's head, filters are selected having gains and phase shifts for different frequency bands that impart spatial cues to the audio channels. These audio channels can be played back through speakers to generate sound that is perceived by the wearer of the head-worn device to originate from the location of the playback device. If the user turns his head to the right, the filters can be updated based on the head-tracked position, to maintain the same virtual location of the sound, e.g., anchored at the location of the playback device.

In some aspects, the one or more filters are applied to the one or more audio channels in response to determining that the microphone signal includes the audio content. Thus, the method verifies that the user can hear the content which can indicate that the user is consuming the content from the playback device.

In some aspects, in response to determining that the microphone signal includes the audio content, the method can determine that a wearer of the head-worn device is directed towards the playback device based on an inertial measurement unit (IMU) or one or more images produced by a camera. The one or more filters can be applied to the one or more audio channels in response to determining that the wearer of the head-worn device is directed towards the playback device. Thus, the system can verify first that the user can hear the playback device, and then can confirm that the user is facing the playback device.

In some aspects, the one or more filters can be applied to the one or more audio channels in response to determining that one or more speakers of the playback device are blocked, positioned incorrectly, or outputting the audio content incorrectly. This can be determined based on sensed audio, object detection (e.g., using computer vision), or combinations thereof. In some cases, a playback device may not support all audio channels of audio content. In response to the playback device not outputting these unsupported audio channels, all the audio channels of the audio content, or just the unsupported audio channels, can be included in the one or more audio channels such that, in the playback of the spatialized audio, the audio channels of the audio content have one or more corresponding virtual locations in a listening area. For example, if the playback device has only a left and right speaker, and the audio content that is streamed to the playback device is 7.1 surround sound, then all or some of the audio channels that are not supported by the playback device (e.g., center, left surround, right surround, rear left surround, rear right surround) can be spatialized in virtual surround sound locations in the user's room. The audio channels of the audio content can be played back with virtual locations that correspond to pre-defined surround sound locations, such as, for example, locations prescribed for 5.1, 7.1, etc.

In some aspects, in response to determining that the microphone signal includes the audio content that is output by the playback device, the method can determine whether the one or more audio channels are available to play for the audio content. In response to the one or more audio channels being present, the one or more filters can be applied to the one or more audio channels resulting in spatialized audio that is used to drive speakers of the head-worn device. For example, if enhanced content is available for 'Movie,' then the method can obtain it and present it to the user. Otherwise, the user can watch 'Movie' without enhancements.

Figure 2:
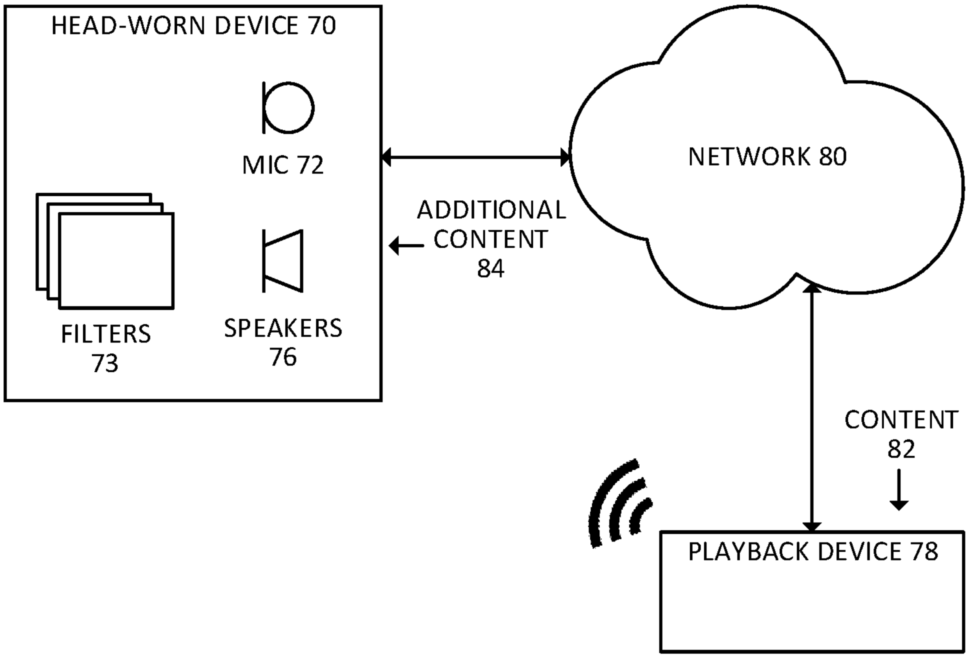
FIG. 2 shows a system for presenting additional audio through speakers of a head-worn device, according to some aspects.

FIG. 2 shows a system for presenting additional audio through speakers of a head-worn device, according to some aspects. A head-worn device 70 includes one or more microphones 72 and one or more speakers 76, such as extra-aural speakers, speakers in an open-back configuration, speakers in a closed-back configuration with transparency, or the like. The head-worn device can be or include a headphone set, smart glasses, a head up display (HUD), virtual reality (VR) displays, or other audio processing device that attaches to a user's head.

Microphone 72 can produce a microphone signal that senses sound in the user's environment. In some aspects, microphone 72 can include one or more microphones, which each produce respective microphone signals. The head-worn device can determine whether or not a playback device 78 is outputting audio and/or visual content. For example, the head-worn device can query the local network 80 to discover one or more playback devices, such as playback device 78, that are present on the local network. The local network can include wireless or wired routers, switches, or other combinations of hardware and software that allow for computing devices such as the head-worn device and the playback device to communicate with each other through one or more protocols such as TCP/IP, Wi-Fi, etc. The head-worn device can query the playback device and/or the network, to determine what content, if any, that the playback device is playing. In some aspects, the query can be performed through a network protocol that the networked devices are configured to communicate over. If the playback device is outputting content 82 which can have an audio and/or visual component, then the head-worn device 70 can obtain additional content 84 that can include one or more audio channels. In some examples, this additional content can be the same as or a subset of content 82. For example, if content 82 includes a center channel of a surround sound format, which typically contains dialogue, then the head-worn device can download the center channel and play this back to the user over speakers 76 to emphasize the dialogue. In other examples, this additional content can be different from but complementary to content 82. For example, additional content can include additional sound effects, dialogue in additional languages, additional dialogue that presents factoids, and/or additional sound sources such as a helicopter flying overhead or a pin dropping behind a user, etc.

Spatial filters 73 can be applied to the one or more channels of the additional content (e.g., through convolution), and the result can be output through speakers. As such, the additional content can be played back to the user at one or more virtual locations that blend in with or supplement the output of the playback device. The speakers 76 of the device can be fixed to a location over or on the side of a user's ears. The speakers do not block other sounds in the user's environment from travelling to the user's ears. Thus, the user can hear content coming from the playback device as well as the additional content being played through the speakers.

In some aspects, the playback device 78 can include a display, such as an LCD display, LED display, or other display technology. The playback device can have speakers integrated with the playback device, such as being housed in a shared housing with the display. Additionally, or alternatively, the playback device can have one or more speakers that are external to the playback device.

Figure 3:
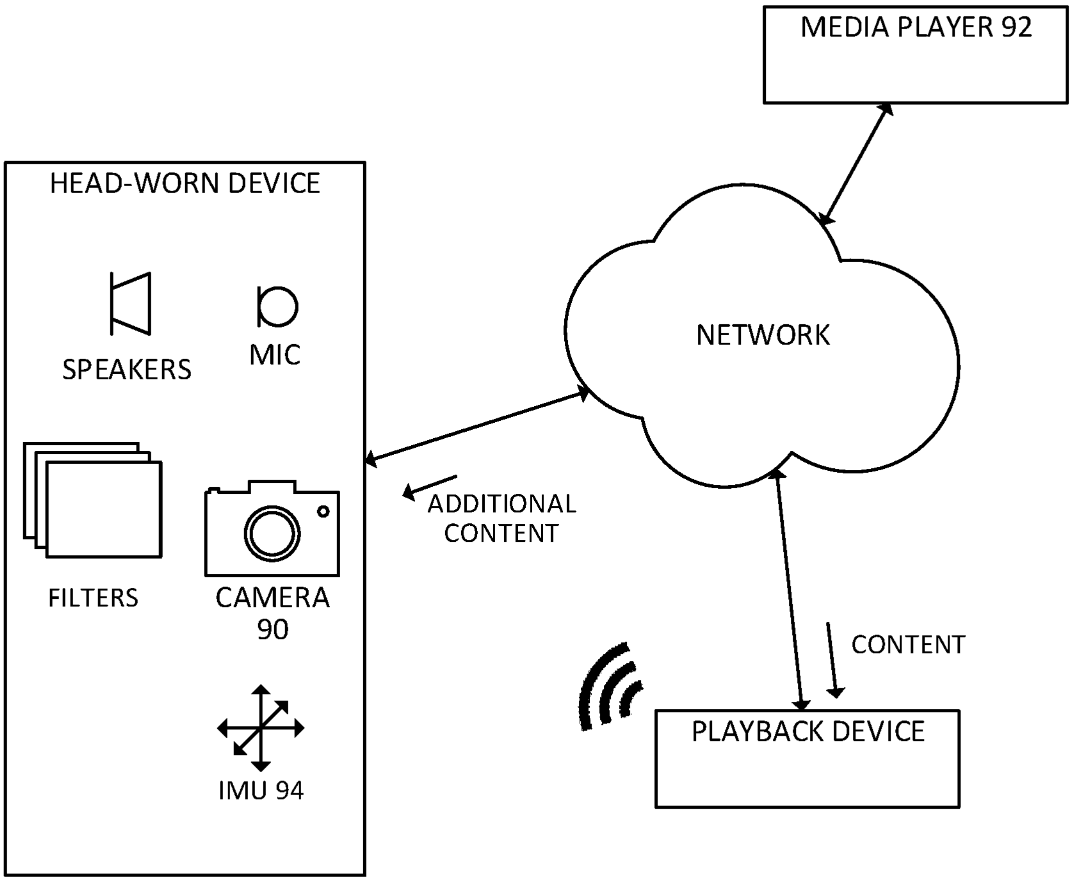
FIG. 3 shows a system for presenting additional audio through speakers of a head-worn device using a camera, according to some aspects.

FIG. 3 shows a system for presenting additional audio through speakers of a head-worn device using a camera, according to some aspects. This figure includes some aspects shown in other figures. A media player 92 can provide the content to the playback device. The content can be streamed to the playback device while playing or downloaded by the playback device as a whole. The head-worn device can communicate with the media player and/or the playback device to determine whether the playback device is outputting audio content, and if so, what that audio content is. The media player can be integrated as part of the play back device or housed in a separate device. The media player can distribute and manage audio, visual, or audiovisual content to different playback devices on the network, which can include the head-worn device.

The head-worn device can obtain information from the playback device or the media device that identifies the audio content that the playback device is outputting. For example, the head-worn device can poll or query the playback device or media device for this information, or 'sign up' for this information in a registry. For example, the head-worn device can add its network address or an ID to a registry of the playback device or media device, such that when the playback device plays content, the playback device or media device notifies the head-worn device that the playback device is playing content, and other information such as what the content is, timestamp information, and/or what the audio format of the playback is (e.g., 5.1, 7.2, stereo, object-based, ATMOS, etc.).

The additional content obtained by the head-worn device can also be downloaded in its entirety or streamed. In some aspects, the additional content can be obtained from a remote server through the network. In other aspects, the additional content can be obtained from media player or the playback device.

The head-worn device can determine that a wearer of the head-worn device is directed or oriented towards the playback device based on an inertial measurement unit (IMU) 94 and/or one or more images produced by a camera 90. As discussed in other sections, one or more head tracking algorithms can be applied to the IMU and/or images to determine the head position of the user. Further, computer vision can be used to detect the playback device in the images, which shows the position of the playback device relative to the head-worn device and whether the user's head is facing the playback device. In some examples, computer vision can be used to identify the content that is being played on the playback device, as well as the position/time stamp of the content (e.g., 3652 seconds into 'Movie'). The detected content and position/timestamp within the content can be compared to playback information (e.g., identity of content and position/timestamp within the content) received from the playback device to confirm that identity of the playback device.

In some aspects, in response to determining that the playback device is playing content and/or that the microphone signals contain the played content of the playback device, the user's head position can be determined relative to the playback device. In response to determining that the user's head is directed or oriented towards the playback device, the one or more spatial filters can be applied to the one or more audio channels, and result can be output through the speakers. In such a manner, if the playback device is playing content in a different room from the user, then the additional content may not be output to the user. Similarly, if the user is turned away from the playback device, then the additional content may not play. If, however, the user is in the listening area of the playback device (e.g., the user can hear the listening device), and is facing the playback device, then the additional content can play through the speakers of the head-worn device, to enhance the user's experience.

Figure 4:
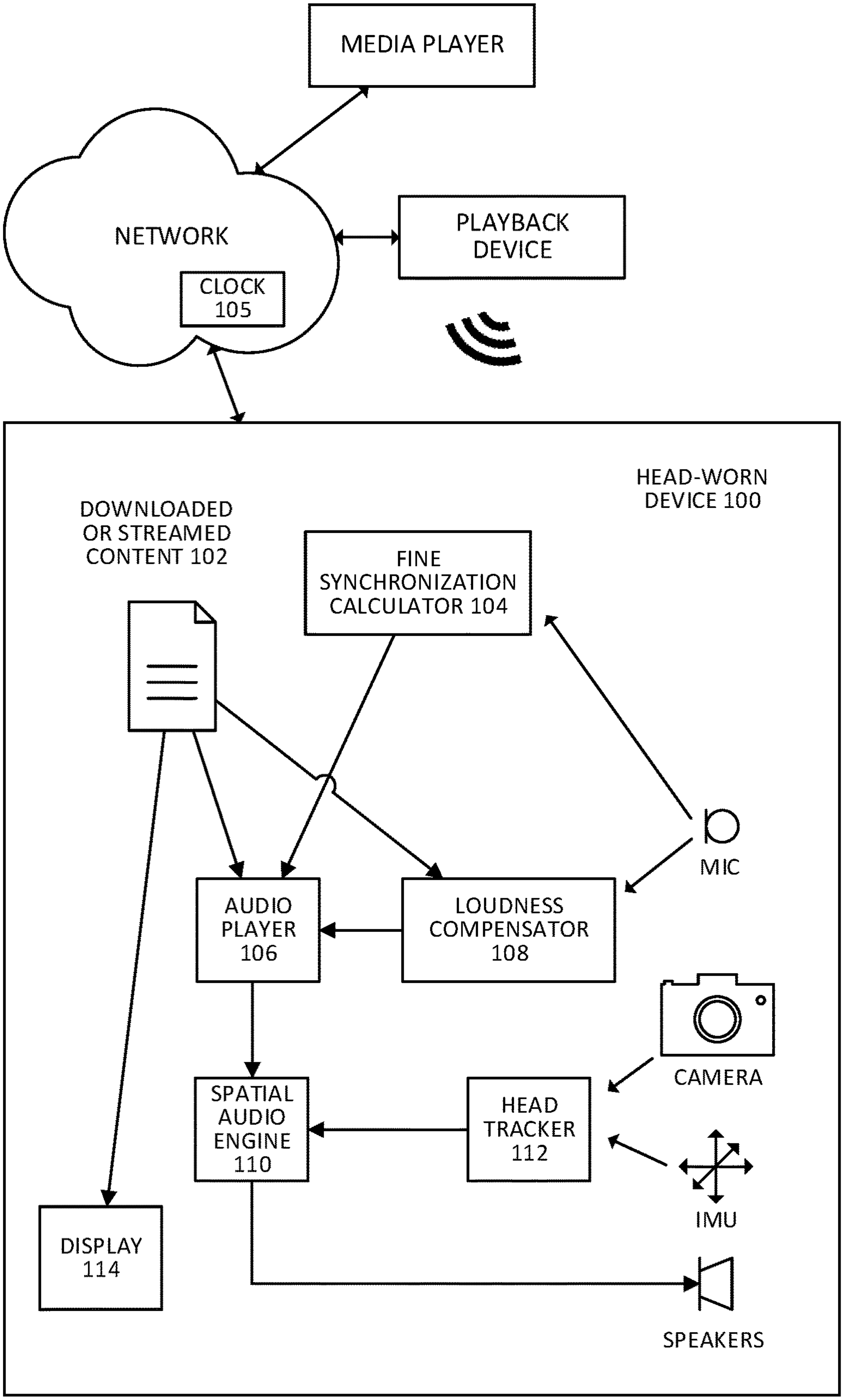
FIG. 4 shows a head-worn device, according to some aspects.

FIG. 4 shows a head-worn device 100, according to some aspects. Any one of the aspects included in this example can be included in other aspects described. As discussed, the head-worn device can obtain additional content 102 which can include audio and/or visual content that is output by the head-worn device to the user. This additional content can be synchronized with the content that is output by the playback device, so that the content is experienced as a whole by the user.

For example, a clock 105 can be accessible to the playback device and head-worn device, for example, over the network. Based on this clock, and information regarding the timing of the content played back by the playback device, the head-worn device can synchronize playback of the additional content so that the additional content follows with the content output by the playback device. Delays, however, can be caused by distance between the playback device and the user and/or delays in the audio processing pipeline of the playback device and speakers thereof.

The head mounted device can use a network audio clock scheme to synchronize its playback clock with the playback device. The head mounted device can use the one or microphone signals and a network audio clock (clock 105) to determine, at block 104, a "time of flight" of acoustic signals from the playback device to the head-worn device. This time of flight can be used to determine a fine-tuned offset (e.g., x milliseconds) with respect to the clock 105. This offset can then be applied at an audio player 106, to compensate for the time of flight and reduce audible artifacts such as phasing when the head mounted device begins playing audio. The clock 105 can include a network time protocol (NTP) that can be used by devices on the network for synchronization.

The playback device can provide a time stamp of when it started playing content, or what frame of the content is being played relative to the shared clock. The head-worn device can synchronize the spatialized audio with the audio content that is present in the microphone signal, by determining the difference between a timestamp of the audio content that is provided by the playback device, and the time in which the same audio content is picked up in the microphone signal. This difference can represent the time of flight and used as the offset to fine-tune the synchronizing of the additional content to the content as heard by the user.

In some aspects, the head-worn device can determine a loudness of an output of the speakers based on a loudness of the audio content that is output by the playback device or sensed by the microphone. The head mounted device can calculate an appropriate playback gain for the additional content. This gain can be determined such that the output of the additional content matches the content being played by the playback device. This gain can help compensate for audio levels of the playback device, the playback device's speaker system, and losses from the playback device to the user. The microphone of the head-worn device can sense the output of the playback device and determine a gain value using the loudness of the content as output by the playback device and sensed by the microphone as a baseline. A loudness compensator 108 can increase or decrease the gains of each channel of the additional content to make it slightly louder, or quieter than the output of the playback, but not by too much (e.g., less than 10% or 5% difference), so that the additional content blends in with the content output by the playback device. If the loudness of the sensed content increases (e.g., the user increases the volume, or moves closer to the playback device), then the loudness of the additional audio can automatically increase. Similarly, if the loudness of the sensed content decreases (e.g., the user turns the volume down, or moves farther away from the playback device), then the loudness of the additional audio can be automatically decreased. In some aspects, however, if the output of the playback device is below a threshold loudness, this may indicate that the speakers of the playback device are obstructed or otherwise not operating as they should. As a fallback, the head-worn device can apply a predetermined loudness to the additional content, to cure such a deficiency.

The audio player 106 can provide one or more channels of the additional content 102 to the spatial audio engine 110. These channels can be offset in time, based on the fine synchronization calculator, to compensate for time of flight, as described. Further, the loudness of the one or more channels can be determined based on the sensed loudness of the content as sensed by one or more microphones of the head-worn device, as described. The spatial audio engine can apply spatial filters to each of the one or more channels, to bestow spatial cues to the one or more channels.

At the spatial audio engine 110, the spatial filters can be determined and updated based on a head position of the user determined at a head tracker block 112. As discussed, a camera of the head-worn device can gather visual information. Similarly, an IMU which can include an accelerometer and/or gyroscope can determine a head position. At the head tracker block 112, one or more head tracking algorithms, for example, Visual Inertial Odometry (VIO), Simultaneous Localization and Mapping (SLAM), and/or other head tracking algorithm, can be applied to the camera information and IMU data, to determine the head position of a user. Based on the head position, a set of spatial filters can be selected to spatially render each of the one or more channels at a respective virtual location, through the speakers of the head-worn device.

The head-worn device can present an affordance to a display 114 of the head-worn device. For example, a prompt in the form of a user interface element can be presented to the display asking the user if they wish to turn on additional audio features. Such an affordance can allow the user to opt-in or opt-out of an audio augmentation on a case-by-case basis. Alternatively, the head-worn device can automatically present the additional audio to the user. In some aspects, the affordance can include an audio cue from speakers on the head-worn device.

In some scenarios, playing of the additional content, which can be referred to as augmentation, can automatically begin such as if a user has previously indicated to the device that they have a hearing impairment and always want to have enhanced dialogue presented. Such settings can be managed locally with respect to the head-worn device and/or be specific to a user (e.g., a user profile). The head-worn device can receive an input from the user of the head-worn device (e.g., through a touch screen input, a button, a voice command, a keyboard, a mouse, or other input device) indicating to play the spatialized audio through the speakers.

Aspects of the head-worn device can be applied for hearing impaired users that have difficulty understanding dialogue in audiovisual works such as movies, sitcoms, news, etc. Because dialogue is typically stored in the center audio channel of audio content, the head-worn device can download the center channel (or any channel that is identified as containing dialogue) and output just that channel at a higher volume for the hearing impaired user. In such a case, other users in the same room can still hear the audiovisual content as output by the playback device at a standard volume with the standard dialog.

As discussed, a user can have a surround sound system included as part of the playback device. Surround sound systems often require and assume that the user has placed each of the surround sound speakers at specific locations relative to a user. Sometimes, a user may be sitting at a non-optimal location or the speakers may not be placed correctly. The head-worn device can detect this based on processing the one or more microphones and/or using computer vision to process camera images to detect the speaker locations in the user's environment. If the speakers are not placed correctly, the user is sitting at a non-optimal location, and/or one of the speakers is not operating properly, the head-worn device can obtain one or more of the surround sound channels and output these spatially. The playback device, or media device that provides content to the playback device, can output the audio in a reduced manner, such as by playing in stereo (with only left and right channels).

The head-worn device can obtain additional audio content from a pool of additional audio content that is associated with the audio content. The audio content can be obtained based on language. For example, if the playback device is outputting 'Movie,' then the head-worn device can select whether they wish to obtain the dialogue for 'Movie' in Chinese, Italian, Korean, Spanish, English, etc. The language of the additional audio content can differ from the language of the audio content output by the playback device.

In some aspects, the audio content can be output by the playback device without dialogue, and each of a plurality of head-worn devices can separately select respective one or more audio channels for presenting to a respective user. For example, a group of users can watch a movie through a playback device. If a first user with a head-worn device speaks Italian, but the content is being shown in Spanish, the first user's head-worn device can download the corresponding dialogue audio (Italian) for the movie and play that back over the speakers. If some or all of the other users also have head-worn devices, then the playback device, media player that manages the playback device, can choose not to play any dialog. Instead, all dialogue can be output by each of the head-worn devices in a language of each user's choosing.

Figure 5:
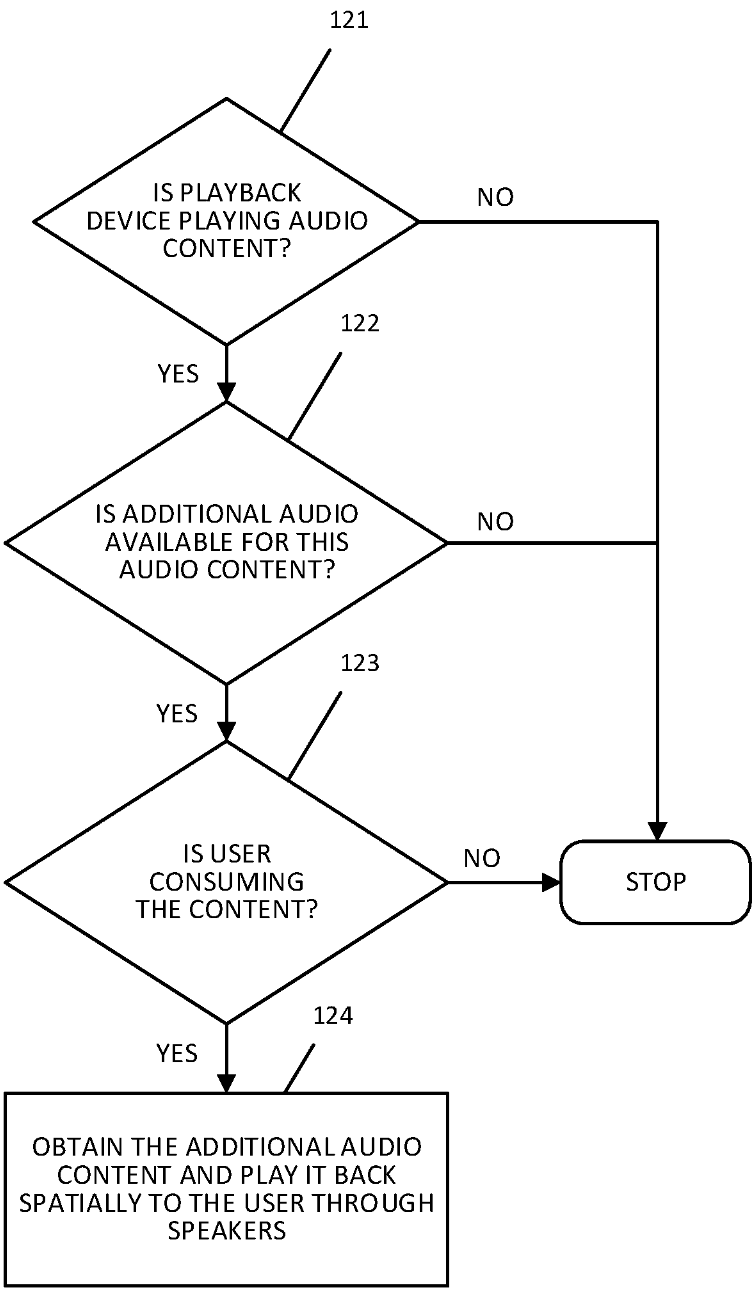
FIG. 5 shows a flow diagram with conditions for presenting additional audio through speakers of a head-worn device, according to some aspects.

FIG. 5 shows a flow diagram with conditions for presenting additional audio through speakers of a head-worn device, according to some aspects. These conditions can be checked by a head-worn device described in various aspects, and/or as part of the method 50 described in FIG. 1.

At block 121, the head-worn device can determine if the playback device is playing audio content. This can be performed by querying the network, analyzing microphone signals, or one or more images from a camera, as described in other sections. For example, a media player and/or a playback device that are on a shared network with the head-worn device can indicate to the head-worn device that the playback device is currently playing 'Movie.' If the playback device is playing content, then the head-worn device can proceed to block 122.

At block 122, the head-worn device can determine whether there is additional audio that is available for the audio content that is being output by the playback device. If the additional audio content is available, then the head-worn device can download the additional audio content and/or provide an affordance to the user to let them opt in or opt out of the additional audio. As discussed, the head-worn device can refer to settings to automatically determine whether or not to present the additional audio to the user. It should be understood that enhanced audio content may not be available for all content. For example, audio enhancements may be available for 'Movie' but not for the evening news.

At block 123, the head-worn device can optionally determine whether the user is consuming the content that is output by the playback device. For example, the head-worn device can perform an audio lookup with an audio search engine to determine if the sounds in the microphone signals match the content that the playback device is playing (as determined at block 121). In some aspects, if the content is picked up in the microphone signals, then the head-worn device can proceed to block 124.

In some aspects, at block 123, the head-worn device can, alternatively or in response to determining that the microphone signal includes the audio content, determine that the head-worn device or a wearer of the head-worn device is directed or oriented towards the playback device based on an inertial measurement unit (IMU) and/or one or more images produced by a camera. Thus, the head-worn device can check if the user can hear the output of the playback device, and then check if the user is facing the playback device, to determine that the user is actually consuming the content of the playback device.

In some aspects, at block 123, the head-worn device can use its camera to determine that visual content that is presented by the playback device is also associated with the audio content that is identified at block 121. This can be performed through a visual search engine, using one or more images taken by the head-worn camera, which include displayed content on the playback device. For example, in block 121, the head-worn device discovers that a playback device is playing 'Movie'. The head-worn device can perform a visual search using one or more of the images captured by its camera, as input to a visual search engine on a network. The search engine may process the image and detect that the image is a match with 'Movie.' Based on the position of the user's head relative to the playback device showing 'Movie,' the head-worn device can determine that the playback device that the user is facing is indeed playing the same content that is identified at block 121. Thus, the head-worn device can assume the user is consuming the content and proceed to block 124 to obtain and play back the additional audio content as an enhancement to 'Movie'.

Some playback devices have a 'mute' or 'silent' mode. As such, the head-worn device can determine the mode of the playback device (e.g., through a network poll or query), and if the playback device is muted, then the head-worn device can rely on the camera images to determine if the playback device sensed by the head-worn device is playing the content that was identified at block 121. In some aspects, if the playback device is in a silent or mute mode, then visual content that is presented by the playback device and sensed by the camera of the head-worn device is used to determine whether or not to apply the one or more filters to the one or more audio channels (e.g., through a visual search engine). Otherwise, the microphone signal is used to determine whether or not to present the spatial audio to the user (e.g., through an audio search engine).

Aspects described for audio processing can be performed as part of an XR experience. XR can include all real-and-virtual combined environments (e.g., Augmented Reality, Virtual Reality, Mixed Reality, etc.) and human-machine interactions generated by computer technology and wearables. The additional audio played by the head-worn device can be associated with a visual experience, and the listening space and sound sources that are in the audio can correspond to spaces and objects that are presented in XR. In some aspects, the additional audio can be associated with images, graphics, symbols, animations, and other visual objects that can be presented on a head-up display of the head-worn device. These visual objects can be presented as a visual overlay to the playback device. The display of the head-worn device can be a see-through glass.

For example, the head-worn device can present 'factoids' that comprise text and/or images that are synchronized with the content shown on the playback device, to provide interesting facts about objects or topics that are current in the content. In some aspects, the additional visual content can be rendered spatially based on a head position of the user. For example, if a user tilts her head or changes seating positions, a view of a graphical object such as an avatar can be updated to show the avatar from a different angle.

Figure 6:
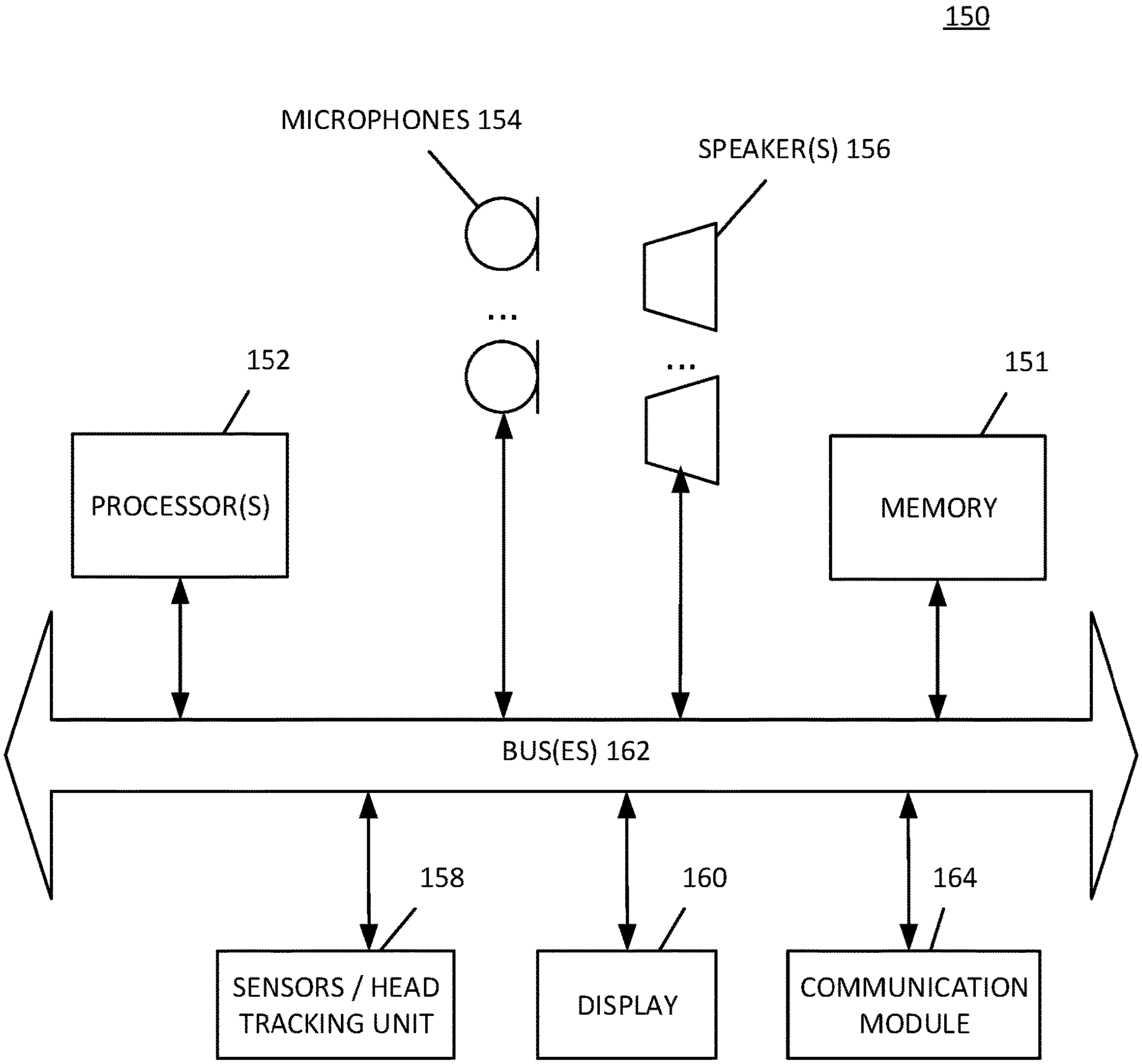
FIG. 6 shows an audio processing system, according to some aspects.

FIG. 6 shows an example of an audio processing system 150, according to some aspects. The audio processing system can be a computing device such as, for example, a desktop computer, a tablet computer, a smart phone, a computer laptop, a smart speaker, a media player, a headphone set, a head mounted display (HMD), smart glasses, an infotainment system for an automobile or other vehicle, or an electronic device for presenting extended reality (XR). The system can be configured to perform the method and processes described in the present disclosure.

Although various components of an audio processing system are shown that may be incorporated into headphones, speaker systems, microphone arrays and entertainment systems, this illustration is merely one example of a particular implementation of the types of components that may be present in the audio processing system. This example is not intended to represent any particular architecture or manner of interconnecting the components as such details are not germane to the aspects herein. It will also be appreciated if other types of audio processing systems that have fewer or more components than shown can also be used. Accordingly, the processes described herein are not limited to use with the hardware and software shown.

The audio processing system 150 includes one or more buses 162 that serve to interconnect the various components of the system. One or more processors 152 are coupled to bus 162 as is known in the art. The processor(s) may be microprocessors or special purpose processors, system on chip (SOC), a central processing unit, a graphics processing unit, a processor created through an Application Specific Integrated Circuit (ASIC), or combinations thereof. Memory 151 can include Read Only Memory (ROM), volatile memory, and non-volatile memory, or combinations thereof, coupled to the bus using techniques known in the art. Sensors/head tracking unit 158 can include an IMU and/or one or more cameras (e.g., RGB camera, RGBD camera, depth camera, etc.) or other sensors described herein. The audio processing system can further include a display 160 (e.g., an HMD, or touchscreen display).

Memory 151 can be connected to the bus and can include DRAM, a hard disk drive or a flash memory or a magnetic optical drive or magnetic memory or an optical drive or other types of memory systems that maintain data even after power is removed from the system. In one aspect, the processor 152 retrieves computer program instructions stored in a machine readable storage medium (memory) and executes those instructions to perform operations described herein.

Audio hardware, although not shown, can be coupled to the one or more buses 162 in order to receive audio signals to be processed and output by speakers 156. Audio hardware can include digital to analog and/or analog to digital converters. Audio hardware can also include audio amplifiers and filters. The audio hardware can also interface with microphones 154 (e.g., microphone arrays) to receive audio signals (whether analog or digital), digitize them if necessary, and communicate the signals to the bus 162.

Communication module 164 can communicate with remote devices and networks. For example, communication module 164 can communicate over known technologies such as Wi-Fi, 3G, 4G, 5G, Bluetooth, ZigBee, or other equivalent technologies. The communication module can include wired or wireless transmitters and receivers that can communicate (e.g., receive and transmit data) with networked devices such as servers (e.g., the cloud) and/or other devices such as remote speakers and remote microphones.

It will be appreciated that the aspects disclosed herein can utilize memory that is remote from the system, such as a network storage device which is coupled to the audio processing system through a network interface such as a modem or Ethernet interface. The buses 162 can be connected to each other through various bridges, controllers and/or adapters as is well known in the art. In one aspect, one or more network device(s) can be coupled to the bus 162. The network device(s) can be wired network devices (e.g., Ethernet) or wireless network devices (e.g., WI-FI, Bluetooth). In some aspects, various aspects described (e.g., simulation, analysis, estimation, modeling, object detection, etc.,) can be performed by a networked server in communication with the capture device.

Various aspects described herein may be embodied, at least in part, in software. That is, the techniques may be carried out in an audio processing system in response to its processor executing a sequence of instructions contained in a storage medium, such as a non-transitory machine-readable storage medium (e.g., DRAM or flash memory). In various aspects, hardwired circuitry may be used in combination with software instructions to implement the techniques described herein. Thus, the techniques are not limited to any specific combination of hardware circuitry and software, or to any particular source for the instructions executed by the audio processing system.

In the description, certain terminology is used to describe features of various aspects. For example, in certain situations, the terms "module", "processor", "unit", "renderer", "system", "device", "filter", "reverberator", "block," "tracker," "engine," "compensator," "calculator," and "component", are representative of hardware and/or software configured to perform one or more processes or functions. For instance, examples of "hardware" include, but are not limited or restricted to, an integrated circuit such as a processor (e.g., a digital signal processor, microprocessor, application specific integrated circuit, a micro-controller, etc.). Thus, different combinations of hardware and/or software can be implemented to perform the processes or functions described by the above terms, as understood by one skilled in the art. Of course, the hardware may be alternatively implemented as a finite state machine or even combinatorial logic. An example of "software" includes executable code in the form of an application, an applet, a routine or even a series of instructions. As mentioned above, the software may be stored in any type of machine-readable medium.

Some portions of the preceding detailed descriptions have been presented in terms of algorithms and symbolic representations of operations on data bits within a computer memory. These algorithmic descriptions and representations are the ways used by those skilled in the audio processing arts to convey the substance of their work most effectively to others skilled in the art. An algorithm is here, and, conceived to be a self-consistent sequence of operations leading to a desired result. The operations are those requiring physical manipulations of physical quantities. It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of an audio processing system, or similar electronic device, that manipulates and transforms data represented as physical (electronic) quantities within the system's registers and memories into other data similarly represented as physical quantities within the system memories or registers or other such information storage, transmission or display devices.

The processes and blocks described herein are not limited to the specific examples described and are not limited to the specific orders used as examples herein. Rather, any of the processing blocks may be re-ordered, combined, or removed, performed in parallel or in serial, as necessary, to achieve the results set forth above. The processing blocks associated with implementing the audio processing system may be performed by one or more programmable processors executing one or more computer programs stored on a non-transitory computer readable storage medium to perform the functions of the system. All or part of the audio processing system may be implemented as, special purpose logic circuitry (e.g., an FPGA (field-programmable gate array) and/or an ASIC (application-specific integrated circuit)). All or part of the audio system may be implemented using electronic hardware circuitry that include electronic devices such as, for example, at least one of a processor, a memory, a programmable logic device or a logic gate. Further, processes can be implemented in any combination of hardware devices and software components.

While certain aspects have been described and shown in the accompanying drawings, it is to be understood that such aspects are merely illustrative of and not restrictive on the broad invention, and the invention is not limited to the specific constructions and arrangements shown and described, since various other modifications may occur to those of ordinary skill in the art.

To aid the Patent Office and any readers of any patent issued on this application in interpreting the claims appended hereto, applicants wish to note that they do not intend any of the appended claims or claim elements to invoke 35 U.S.C. 112(f) unless the words "means for" or "step for" are explicitly used in the particular claim.

It is well understood that the use of personally identifiable information should follow privacy policies and practices that are recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

What is claimed is:

1. A method comprising:

obtaining a microphone signal produced by a microphone of a head-worn device;

determining that a playback device, a distance away from a user wearing the head-worn device, is outputting audio content from one or more speakers of the playback device;

determining that the microphone signal includes the audio content that is output by the one or more speakers of the playback device; and applying one or more filters to one or more audio channels based on a location of the playback device resulting in spatialized audio that is used to drive speakers of the head-worn device, wherein a camera of the head-worn device is used to determine that visual content presented by the playback device is associated with the audio content, and in response to the visual content being associated with the audio content, the one or more filters are applied to the one or more audio channels resulting in the spatialized audio that is used to drive the speakers of the head-worn device.

2. The method of claim 1, wherein applying the one or more filters to the one or more audio channels gives the spatialized audio a virtual location that appears to originate from the location of the playback device.

3. The method of claim 1, wherein the one or more filters are applied to the one or more audio channels such that the spatialized audio has a plurality of virtual locations that appears to have a plurality of fixed positions surrounding a wearer of the head-worn device.

4. The method of claim 1, wherein determining that the playback device is outputting audio content includes obtaining information from the playback device or a separate media device that identifies the audio content that is output by the playback device.

5. The method of claim 1, wherein the one or more filters are applied to the one or more audio channels in response to determining that the microphone signal includes the audio content.

6. The method of claim 1, further comprising, in response to determining that the microphone signal includes the audio content, determining that the head-worn device is oriented towards the playback device based on an inertial measurement unit (IMU) or one or more images produced by a camera, wherein the one or more filters are applied to the one or more audio channels in response to determining that the head-worn device is oriented towards the playback device.

7. The method of claim 1, wherein the one or more filters are applied to the one or more audio channels in response to determining that the one or more speakers of the playback device are blocked, positioned incorrectly, or outputting the audio content incorrectly.

8. The method of claim 1, further comprising synchronizing the spatialized audio with the audio content that is present in the microphone signal, based on a time of flight of the audio content from the playback device to the head-worn device.

9. The method of claim 1, further comprising presenting a prompt to a display of the head-worn device and receiving an input indicating to play the spatialized audio through the speakers of the head-worn device.

10. The method of claim 1, further comprising adjusting a loudness of an output of the speakers of the head-worn device based on a loudness of the audio content that is output by the playback device or sensed by the microphone.

11. The method of claim 1, further comprising adjusting the one or more filters based on a tracked head position that is determined based on one or more sensors of the head-worn device, to compensate for the tracked head position of a user.

12. The method of claim 1, further comprising, in response to determining that the microphone signal includes the audio content that is output by the playback device, determining whether the one or more audio channels are available to play for the audio content, wherein in response to the one or more audio channels being present, the one or more filters are applied to the one or more audio channels resulting in spatialized audio that is used to drive the speakers of the head-worn device.

13. The method of claim 1, wherein the one or more audio channels includes a language that is different from a language of the audio content.

14. The method of claim 1, wherein the audio content is output by the playback device without dialogue, and each of a plurality of head-worn devices separately select respective one or more audio channels for presenting to a respective user.

15. The method of claim 1, wherein if the playback device is in a silent or mute mode, then visual content that is presented by the playback device is used to determine whether or not to apply the one or more filters to the one or more audio channels, otherwise the microphone signal is used to determine whether or not to present the spatialized audio to a user.

16. The method of claim 1, wherein the one or more audio channels includes dialogue and a loudness of the dialogue is increased in the spatialized audio when used to drive the speakers of the head-worn device.

17. The method of claim 1, wherein in response to the playback device not outputting unsupported audio channels of the audio content, the unsupported audio channels are included in the one or more audio channels such that, in playback of the spatialized audio, the unsupported audio channels have one or more corresponding virtual locations in a listening area.

18. A head-worn device having:

one or more microphones that produce one or more microphone signals, speakers, and a processor, configured to perform the following:

determining that a playback device, a distance away from a user wearing the head-worn device, is outputting audio content from one or more speakers of the playback device;

determining that the one or more microphone signals includes the audio content that is output by the one or more speakers of the playback device; and applying one or more filters to one or more audio channels based on a location of the playback device resulting in spatialized audio that is used to drive the speakers of the head-worn device, wherein if the playback device is in a silent or mute mode, then visual content that is presented by the playback device is used to determine whether or not to apply the one or more filters to the one or more audio channels, otherwise the one or more microphone signals are used to determine whether or not to present the spatialized audio to a user.

19. The head-worn device of claim 18, wherein the one or more filters are applied to the one or more audio channels such that the spatialized audio has a virtual location that is perceived by a wearer of the head-worn device to originate from a location of the playback device.

20. The head-worn device of claim 18, wherein applying the one or more filters to the one or more audio channels gives the spatialized audio a virtual location that appears to originate from the location of the playback device.

* * * * *